(12) United States Patent
Choi

(10) Patent No.: US 7,847,794 B2
(45) Date of Patent: Dec. 7, 2010

(54) MONITOR APPARATUS FOR A VEHICLE

(75) Inventor: In Young Choi, Jeonju-si (KR)

(73) Assignee: Hyundai Motor Company, Seoul (KR)

( * ) Notice: Subject to any disclaimer, the term of this patent is extended or adjusted under 35 U.S.C. 154(b) by 1012 days.

(21) Appl. No.: 11/648,890

(22) Filed: Dec. 29, 2006

(65) Prior Publication Data

US 2008/0100548 A1    May 1, 2008

(30) Foreign Application Priority Data

Oct. 31, 2006    (KR) .................. 10-2006-0106087

(51) Int. Cl.
  *G09G 5/00*    (2006.01)
(52) U.S. Cl. .................. 345/204; 345/156; 345/905; 361/679.02; 361/679.06; 108/44
(58) Field of Classification Search .................. 345/905, 345/156, 204, 1.1; 361/681–683, 679.02, 361/679.06; 348/148, 291, 837, 838, 48; 340/461, 438, 903, 169.1, 436, 937; 296/24.1, 296/37.7, 37.8; 248/917–918; 108/44
See application file for complete search history.

(56) References Cited

U.S. PATENT DOCUMENTS 6,412,848 B1 *  7/2002  Ceccanese et al. ......... 296/37.7
6,557,812 B2     5/2003  Kutzehr et al.
2002/0154007 A1* 10/2002  Yang ..................... 340/456
2006/0164230 A1*  7/2006  DeWind et al. .......... 340/461

FOREIGN PATENT DOCUMENTS

| JP | 04-14549 | 5/1992 |
|----|----------|--------|
| JP | 04-28145 | 5/1992 |
| JP | 06-49220 | 5/1994 |
| JP | 11-310087 | 11/1999 |
| JP | 2000-159197 | 6/2000 |
| JP | 2001-026242 | 1/2001 |
| JP | 2001-030848 | 2/2001 |
| JP | 2003-002128 | 1/2003 |
| JP | 2004-217079 | 8/2004 |
| JP | 2005-329760 | 12/2005 |
| KR | 2003-0010750 | 7/2003 |
| KR | 2003-0031606 | 2/2004 |
| KR | 2004-0036543 | 12/2004 |
| WO | WO 2004/089695 A1 | 10/2004 |

* cited by examiner

*Primary Examiner*—Quan-Zhen Wang
*Assistant Examiner*—Jennifer T Nguyen
(74) *Attorney, Agent, or Firm*—Morgan, Lewis & Bockius LLP

(57) ABSTRACT

The present invention relates to a monitor apparatus for a vehicle. The monitor apparatus is configured such that the LCD monitor protrudes from a case inside a shelf by sliding out through a transfer device. According to the present invention, the monitor apparatus slides in and out by means of a transfer device which pushes and pulls the monitor in a lateral direction.

8 Claims, 12 Drawing Sheets

MONITOR APPARATUS FOR A VEHICLE

CROSS-REFERENCE TO RELATED APPLICATION

This application claims priority to Korean Patent application No. 10-2006-0106087, filed on Oct. 31, 2006, in the Korean Intellectual Property Office, the disclosure of which is incorporated herein by reference.

BACKGROUND OF THE INVENTION a) Field of the Invention

The present invention relates to a monitor apparatus for a vehicle. In particular, the monitor apparatus is installed on buses or trains for passengers to view.

b) Description of the Related Art

In general, a monitor, which receives and displays an internal or an external video signal, is installed in a vehicle such as a bus or a train and provides passengers with high quality entertainment.

In particular, the monitor installed in the bus is a CRT (Cathode Ray Tube) monitor which is the same size and type as the monitor for home use and is installed on a dashboard so that passengers may watch the monitor. Since the monitor itself is quite heavy, the monitor is mounted on the separate frame.

Recently, a LCD (Liquid Crystal Display) monitor is being widely used and the monitor in the bus or the train is also being replaced by the LCD monitor. The LCD monitor is generally mounted on the roof in the middle of the aisle.

However, the conventional LCD monitor apparatus for the bus has following problems. First, since the LCD monitor apparatus is installed in the middle of the aisle, a passenger's head may hit the monitor in the open state. Furthermore, the rotational axis of the conventional LCD monitor is positioned in the upper end, thereby applying more torque to the motor for rotating the LCD monitor 3 about the rotational axis. Therefore, the position of the rotational axis may have an adverse effect on the durability of the motor.

The present invention overcomes the drawbacks described above. The present invention is configured such that the LCD monitor protrudes from a case inside a shelf by sliding out through a transfer device. When the LCD monitor is not being used, the LCD monitor goes back into the shelf and thus does not protrude out. Therefore, passengers have greater accessibility when getting on or off the vehicle through the aisle.

SUMMARY OF THE INVENTION

The monitor apparatus of the present invention comprises: a case that is installed in a shelf mounted on the lateral surface of the roof in the vehicle; a LCD monitor that is slidable from a connection/guide device inside the case; a positioning sensing device that is installed in the case so as to sense the position of the LCD monitor; a controller that outputs a control signal which moves the LCD monitor to the fully developed position and the fully received position according to a signal from an operational switch and a signal from the positioning sensing device; and a transfer device that transfers the LCD monitor in response to control signals generated from the controller between the fully received position and the fully developed position in the lateral direction.

In one embodiment, the components of the monitor including the case are received in the internal space between the shelf lead and a lead so that the LCD monitor is received in the internal space of the shelf in the fully received position and is developed out of the shelf in the direction of the shelf in the fully developed position.

In another embodiment, the connection/guide devices comprises a female rail and a male rail installed in the internal surface of the case and in the upper end of the LCD monitor, respectively and are slidably connected to each other.

In another embodiment, the positioning sensing device comprises: a limit switch for sensing the received position and the developed position installed in the protrusions of first upper end and in the second upper end; and an upper side stopper that is installed in the internal surface of the case inlet so as to press the limit switch for sensing the received position in the fully received position and the limit switch for sensing the developed position in the fully developed position.

In another embodiment, the transfer device comprises: a forward/reverse motor capable of rotating in a forward or reverse direction in response to a control signal generated by the controller in which the forward/reverse motor is installed in one side end of the lower end of the internal space of the case; and a screw axis whose one end is integrally connected to the rotational axis of the forward/reverse motor, and the second end of which is connected to a lower side stopper installed in the second side end of the lower side of the internal space of the case. The screw axis is coupled to the LCD base installed on the lower end of the LCD monitor and is connected in the axis, thereby pushing or pulling the LCD monitor in the lateral direction in accordance with the direction of rotation of the forward/reverse motor.

In another embodiment, the LCD base comprises: a half round-shape surface recess, which is formed on the lower surface thereof, and wherein a screw thread is formed on the inner surface of the half round-shape surface recess so that a screw thread is engaged with a thread formed on the screw axis.

In another embodiment, a stopper end is formed in an outer end of the LCD base. The stopper end contacts with the lower side stopper. The stopper end is caught by the lower side stopper when the LCD monitor is received in the case completely.

In another embodiment, a rubber pad for absorbing an impact is attached to the surface which is in contact with the stopper end of the lower side stopper.

In yet another embodiment, a weight block, which is to provide weight balance when the LCD monitor is extended out of the case, is integrally installed in the second end of the LCD base.

The features and advantages of the present invention will be fully understood and appreciated from the following detailed description of the accompanying drawings.

BRIEF DESCRIPTION OF THE DRAWINGS

FIG. 1 illustrates a LCD monitor apparatus in an open state. FIG. 2 illustrates a LCD monitor apparatus in a closed state.

FIG. 4 shows the fully received state of the LCD monitor. FIG. 5 shows the fully developed state of the LCD monitor.

DETAILED DESCRIPTION OF THE INVENTION

Hereinafter, the present invention will be described with reference to the accompanying drawings.

Figure 1:
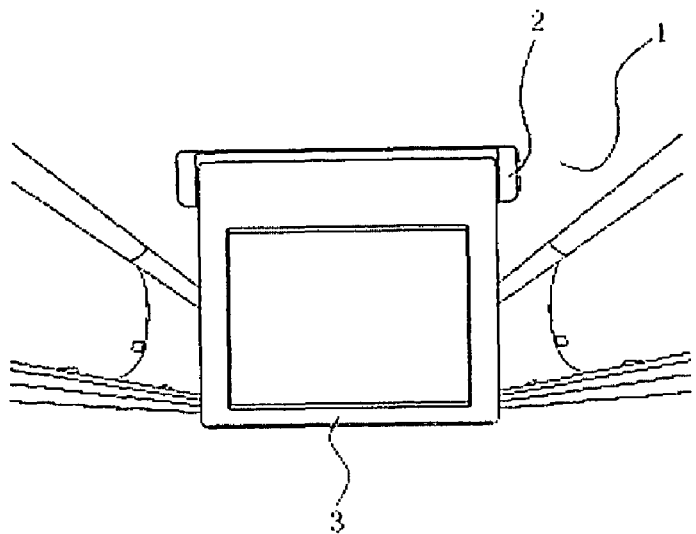
FIG. 1 and FIG. 2 are views which illustrate a LCD monitor apparatus for vehicle.
Figure 2:
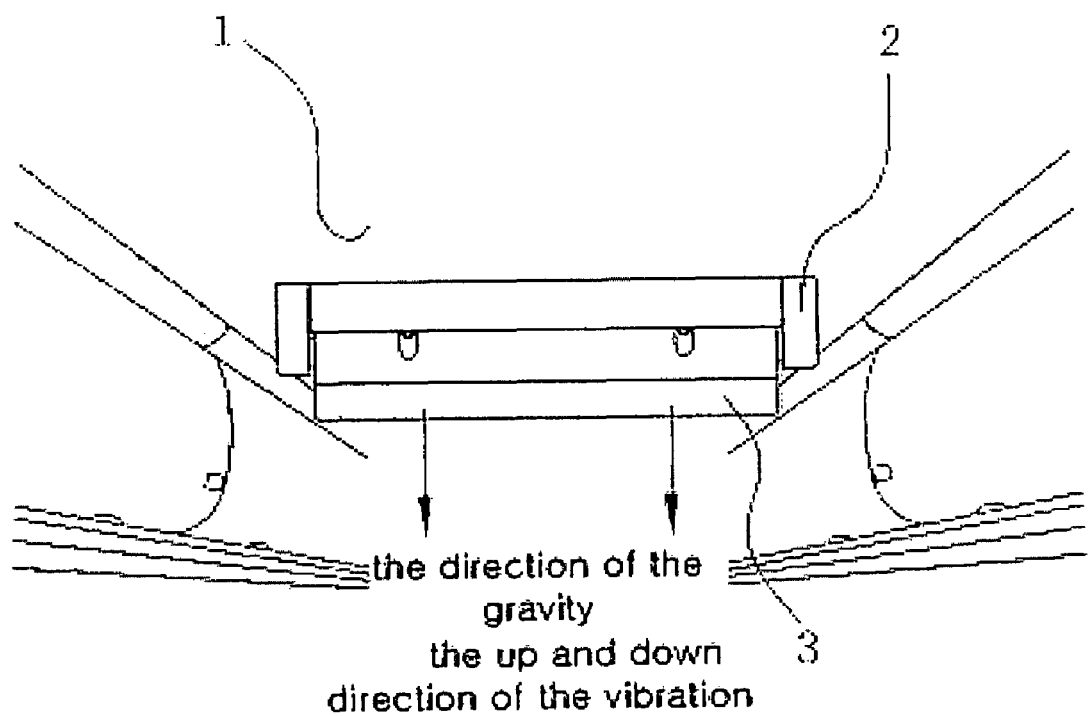

FIG. 1 and FIG. 2 illustrate the LCD monitor apparatus. In particular, the figures illustrate the LCD monitor apparatus is in the middle row, whereby FIG. 1 shows the LCD monitor which is open, and FIG. 2 shows the LCD monitor which is closed.

As shown in the drawings, the LCD monitor apparatus is mounted on the roof 1 in the middle of the aisle, and it is rotated about the rotational axis in which the LCD monitor 3 is attached. In other words, the rotational axis installed in the upper side of the LCD monitor 3 is rotationally connected to a mount 2 which is installed in the roof. When the LCD monitor is turned on, (i.e., open state), the mount is rotated downward about the rotational axis (referring to FIG. 1). When the LCD monitor is turned off, (i.e., closed state), the mount is rotated upward about the rotational axis (referring to FIG. 2).

In particular, the present invention is a monitor apparatus configured such that the LCD monitor is buried between the lids of the shelf by use of the internal space of the shelf installed in the left and right side of the roof. The monitor comprises a LCD monitor; a case installed on the left and right side of the shelf, in which the LCD monitor is stored; and a mechanical/electrical instrument which transfers the LCD monitor out of the case in the direction of the aisle when it is used and transfers the LCD monitor into the case when it is not used.

The monitor apparatus is received in the case of the shelf and buried in the internal space of the shelf when it is not used. It is transferred out of the case in the lateral direction and positioned in the aisle side when it is used.

Of course, the LCD monitor disposed in the aisle side is reversibly transferred into the internal space of the shelf in the lateral direction after use.

Figure 3:
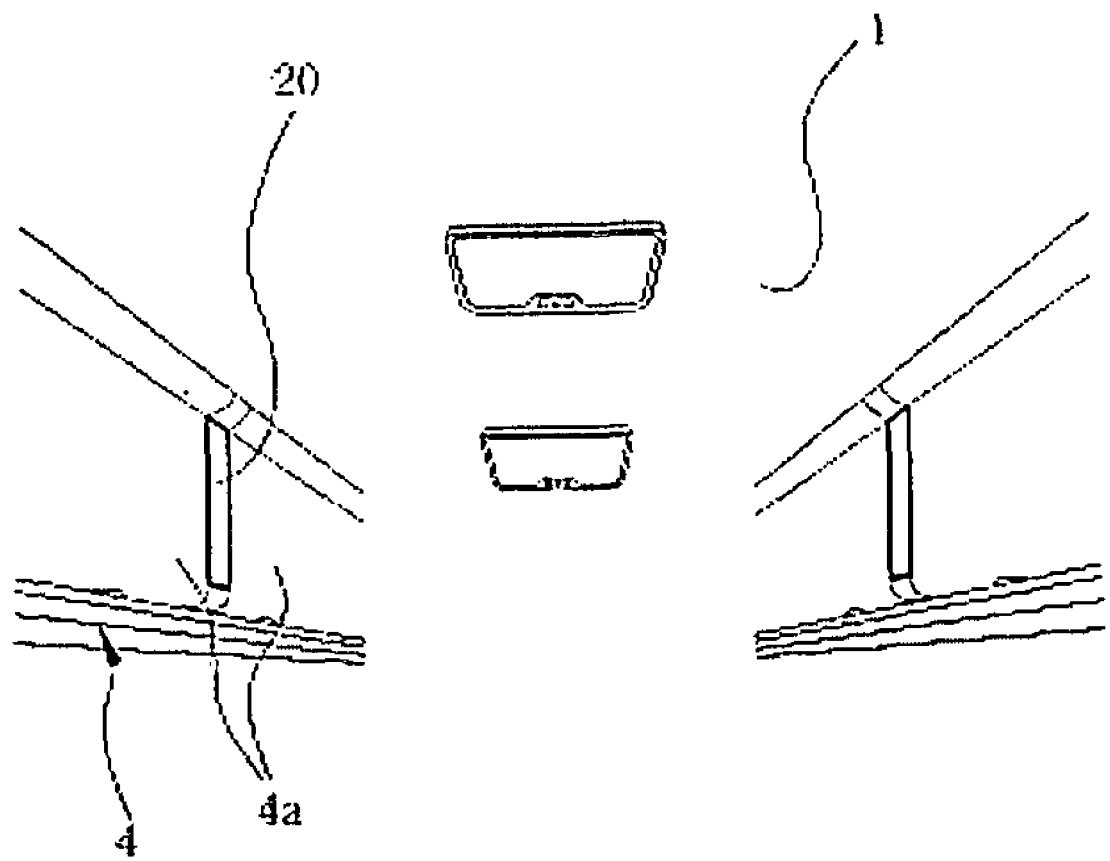
FIG. 3 is an installation state view which illustrates the place of the installation of the monitor apparatus for vehicle according to the present invention.

FIG. 3 is the installation state view and shows the LCD monitor 20 which is received in the case inside the shelf 4 installed in the left and right side of the roof 1.

Figure 4:
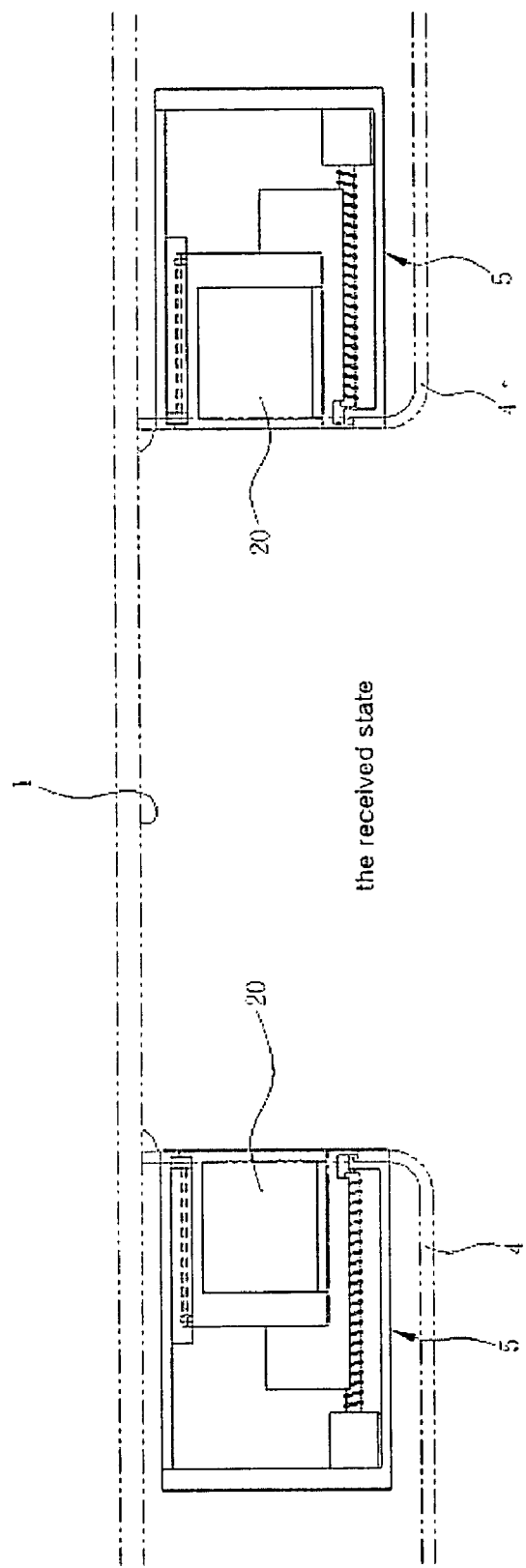
FIG. 4 and FIG. 5 are views which illustrate the components of the monitor apparatus according to the present invention.

As shown in FIGS. 3 and 4, the left and right side monitor apparatuses 5 are installed in the left and right shelves 4 respectively. In particular, each component including the case is built in the internal space defined by the shelf 4 and neighboring lids 4*a*. Consequently, the passengers are not interrupted by the monitor apparatus 5 when getting on and off the vehicle, since none of the components of the LCD monitor 20 protrudes from the shelf 4 when it is received in the case.

Figure 5:
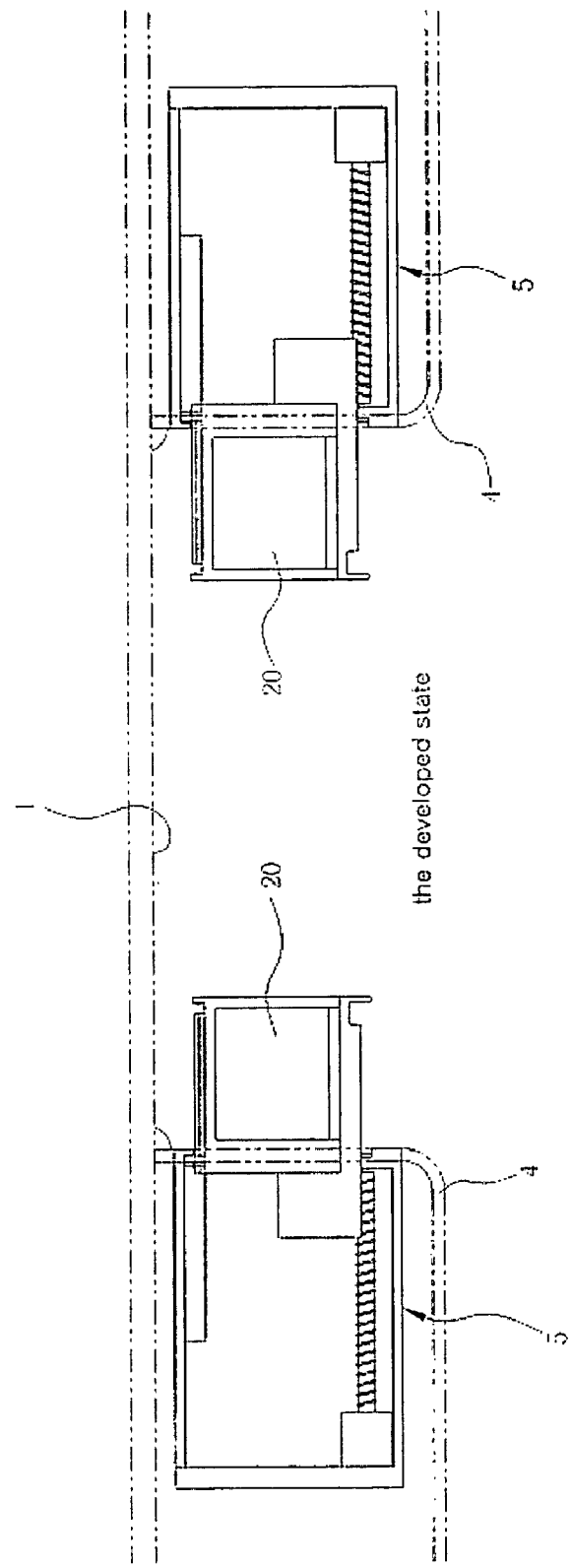

FIGS. 4 and 5 show the components of the monitor apparatus 5 according to the present invention, whereby the respective component including the case 10 is installed in the shelf 4.

FIG. 4 shows that the LCD monitor 20 is fully received in the case 10 which is installed in the internal space of the shelf 4 in the side place of the roof 1. FIG. 5 shows that the LCD monitor 20 is fully developed to the aisle to use.

Figure 6:
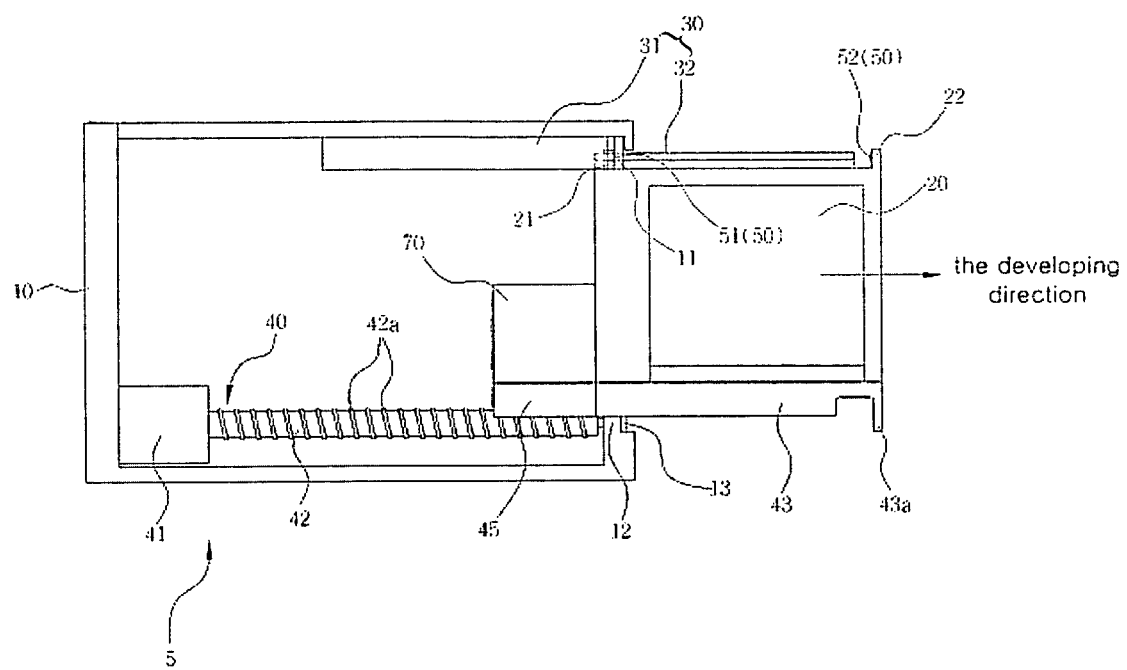
FIG. 6 is a front view which illustrates the LCD monitor apparatus with a developed state.
Figure 7:
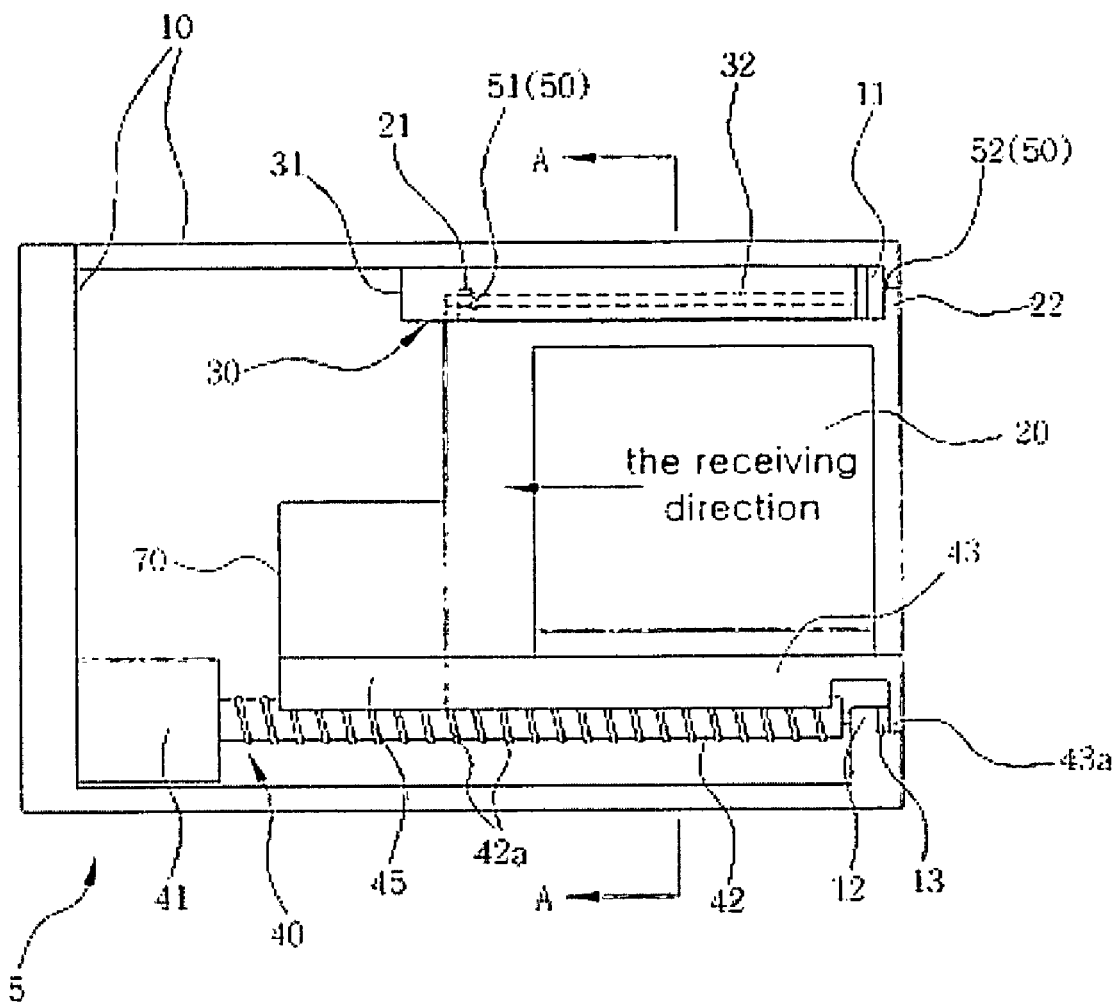
FIG. 7 is a front view which illustrates the LCD monitor apparatus with a received state.
Figure 8:
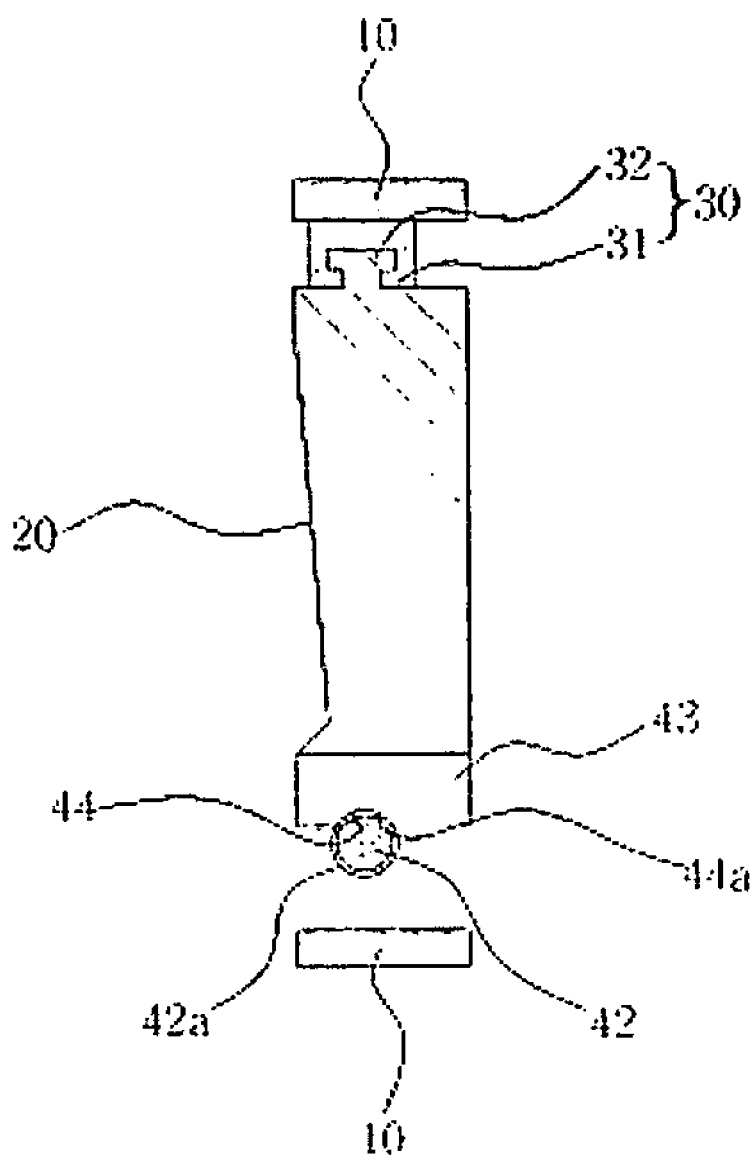
FIG. 8 is a cross-sectional view taken along line A-A of FIG. 7.
Figure 9:
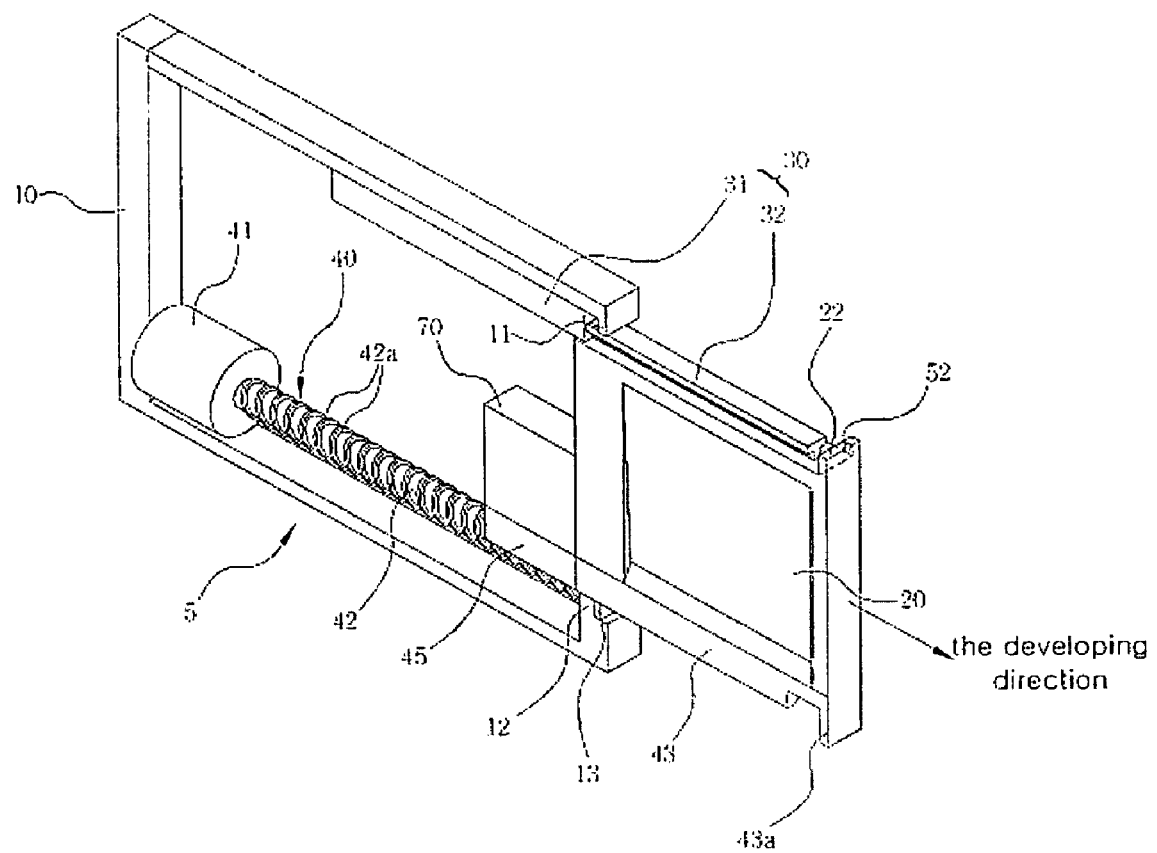
FIG. 9 is a perspective view which illustrates the LCD monitor with a received state according to the present invention.
Figure 10:
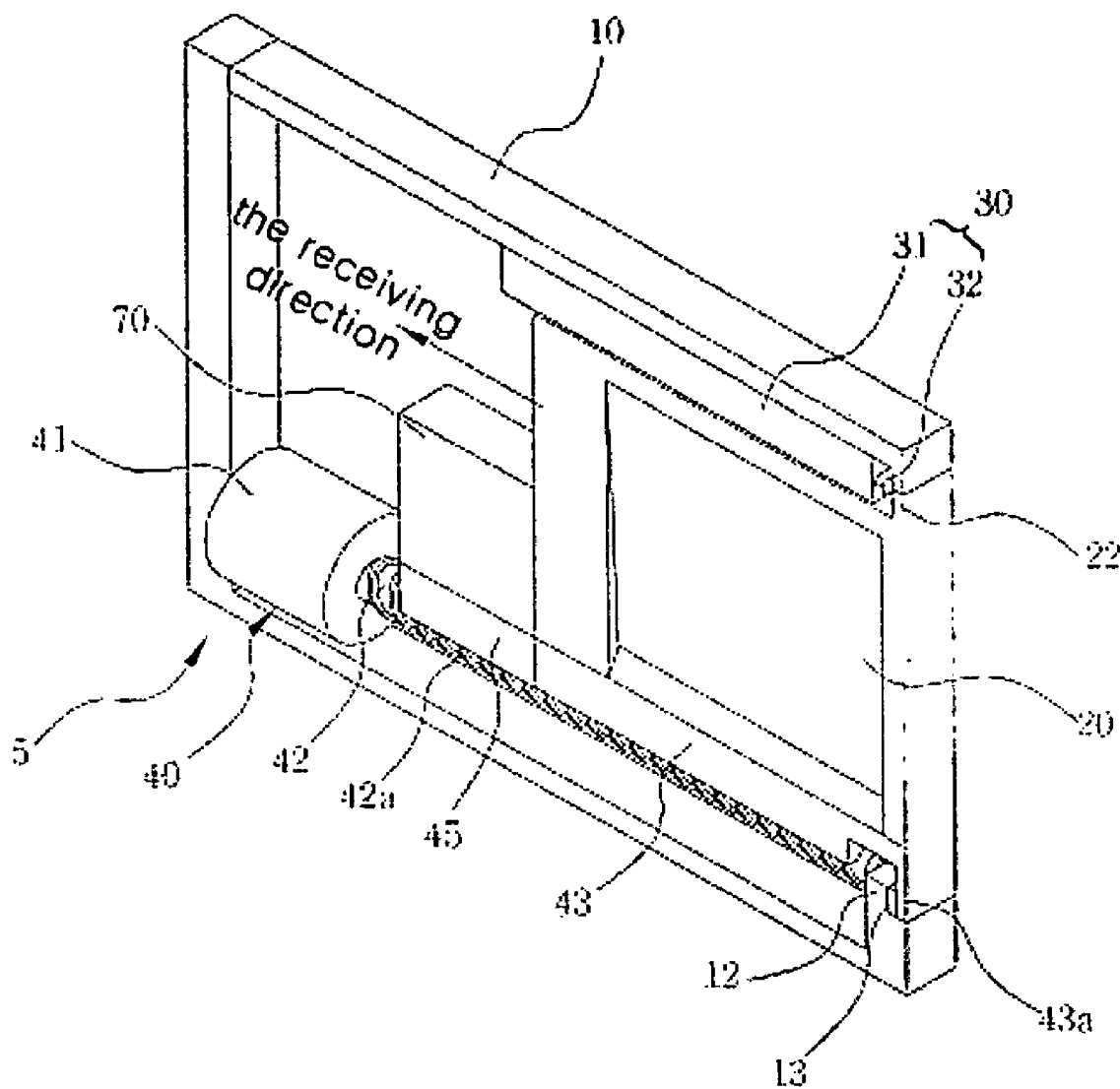
FIG. 10 is a perspective view which illustrates the LCD monitor with a developed state according to the present invention.
Figure 11:
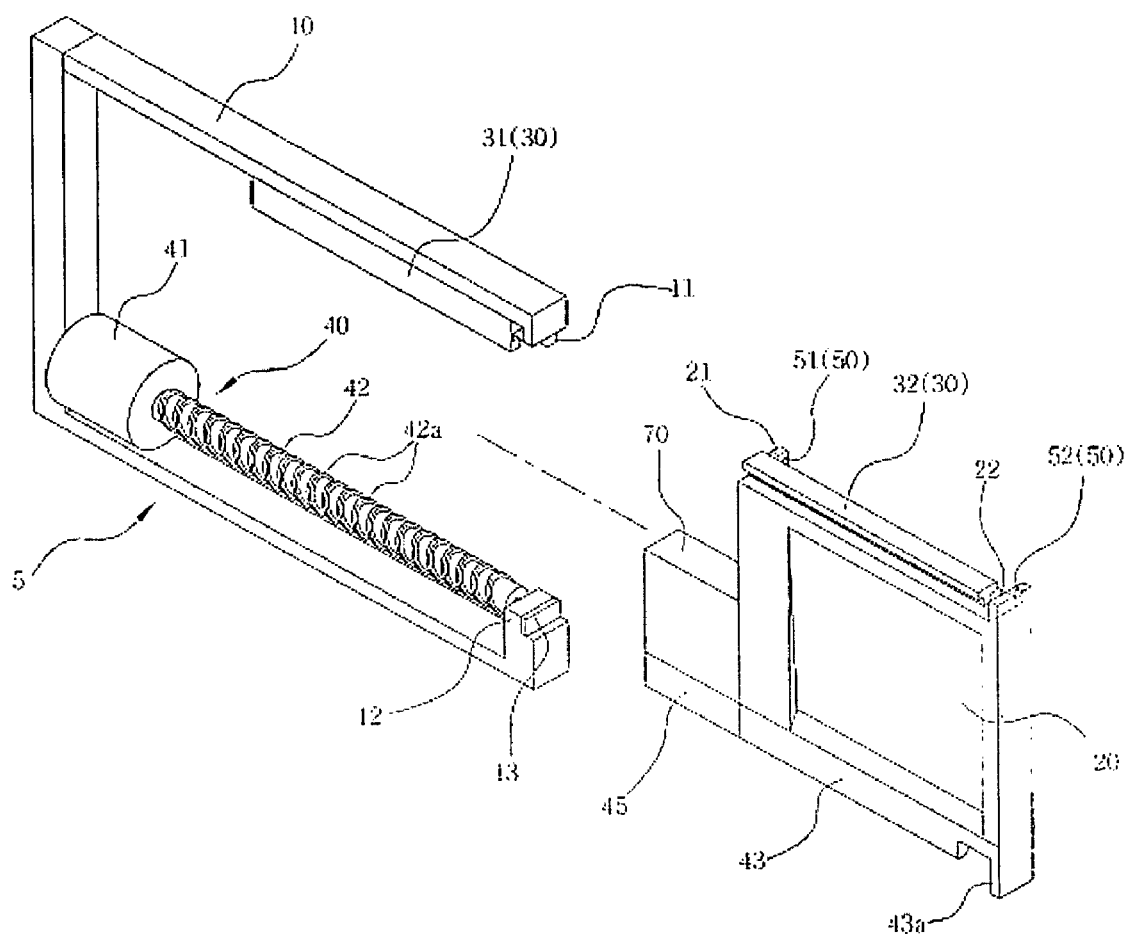
FIG. 11 is a view which illustrates the LCD monitor separated from the frame according to the present invention.

The LCD monitor 20 of the monitor apparatus 5 of the present invention, as shown in FIGS. 4-6, is able to reciprocate in the lateral direction so as to be received (when the LCD monitor is not used) and to be developed(when the LCD monitor is used). The transfer device 40 for transferring the LCD monitor 20 to the left and right is installed in the case 10 inside the internal space of the shelf 4 so as to transfer the LCD monitor 20 to the left and right.

The LCD monitor 20 is transferred out of the case 4 inside the internal space of the shelf 4 to the aisle and is fully extended as shown in FIG. 5 when it is used. The LCD monitor 20 is transferred into the case and is received in the space inside the shelf 4 as shown in FIG. 4.

As shown above, the monitor apparatuses 5 are installed in the left and right shelf 4 respectively. The monitor apparatuses 5 of the present invention may be installed in both the left and right shelf 4 or they may be installed in either the left shelf 4 or the right shelf 4.

The conventional foldaway monitor is not convenient since passengers hit the monitor when it is open. However, the present invention allows passengers greater accessibility because the monitor is operated by a back and forth movement in the lateral direction. Furthermore, when the monitor is being used, it is not disposed right above the aisle which the passengers go through, but rather is disposed around the shelf.

Furthermore, the conventional LCD monitor is rotated upwardly and downwardly, thereby creating durability and the reliability problems. However, according to the monitor apparatus 5 of the present invention, the LCD monitor 20 is moved to the side by means of the screw axis connected to the forward/reverse rotational motor, and thus the stable movement is possible.

Hereinafter, the components of the monitor apparatus according to the present invention will be described with reference to the accompanying drawings.

As shown in the drawings, the monitor apparatus 5 of the present invention comprises a LCD monitor 20; a case 10 in which the LCD monitor 20 is installed; and a transfer device 40 that is installed in the case 10 and transfer the LCD monitor 20 in order to receive it or to extend it.

The LCD monitor according to the present invention outputs the video signal and audio signal. The LCD monitor is provided with a control box 70 having lots of operational parts, the controller 72, and an operational switch 60.

The component which controls the transfer device 40 to move the LCD monitor 20 in a lateral direction is further provided in the control box 70.

The case 10 is installed in the internal space inside the shelf 4. The case forms the contour of the monitor apparatus 5 and is disposed in the space between the lids 4*a* of the shelf 4. The case is configured such that the LCD monitor connected in the case is able to move in the lateral direction.

The connection/guide device 30, which connects the case 10 and the LCD monitor 20 together and guides the LCD monitor 20 in the case 10, is provided between the case 10 and the LCD monitor 20. The connection/guide device 30 comprises rails installed in the case 10 and the LCD monitor 20 respectively. In one embodiment, the female rail 31, which guides the path when the LCD monitor 20 moves, is installed in the inner surface of the upper side of the case 10 in a longitudinal direction. In another embodiment, the male rail 32, which is guided along the female rail 31 of the case 10 where it is inserted in the female rail 31, is formed on the upper side of the LCD monitor 20. The female rail 31 of the case 10 and the male rail 32 of the LCD monitor 20 together guide the LCD monitor 20 along the path in the case 10 in a state that they are connected together.

As described above, the female rail 31 and the male rail 32 are installed in the case 10 and the LCD monitor 20 respectively. The female and male rails 31, 32 are assembled together such that they are connected to each other. The male rail 32 is movable along the female rail 31 in a connected state, and thus the LCD monitor 20 is able to move from the inside of the case to the outside of the case stably by means of the rail connective structure.

By means of the rail connective structure, the LCD monitor 20 according to the present invention is able to slide inside or outside of the case 10. In particular, the LCD monitor 20 is configured such that it is able to move in the lateral direction when it slides.

Here, if the LCD monitor 20 is extended out of the case 10 as the male rail 32 of the LCD monitor 20 moves along the female rail 31, then the LCD monitor 20 protrudes in the direction of the aisle as shown in FIG. 3. If the LCD monitor 20 is inserted in the case 10, then the LCD monitor 20 will be buried in the internal space of the shelf 4 as shown in FIG. 4.

In other embodiments, the female rail 31 is installed in the case 10 and the male rail 32 is installed in the LCD monitor 20 respectively. Additionally, the female rail 31 may be installed in the LCD monitor 20 and the male rail 32 is installed in the case 10.

Furthermore, the positioning sensing device 50, which senses the received and developed positions, is installed between the case 10 and the LCD monitor 20, whereby the positioning sensing device 50 is comprised of two limit switches 51, 52. In a preferred embodiment, the limit switches 51, 52 may be installed in the LCD monitor 20, whereby the two limit switches 51, 52 are installed in the projections 21, 22 formed on the one side end of the upper end of the LCD monitor 20 and on the second side of the upper end of the LCD monitor 20. One of the limit switches senses the fully developed position of the LCD monitor 20. The second limit switch senses the fully buried position of the LCD monitor 20. Both of the two limit switches 51, 52 are configured such that they are pushed by the upper side stopper 11 which protrudes from the inner surface of the inlet of the case 10 downwardly, and is turned on when the upper side stopper 11 pushes it.

If the LCD monitor 20 is transferred from the case 10 to the position that is fully developed, then the upper side stopper 11 of the case 10 will push the limit switch 51 installed in the one side end of the LCD monitor 20 and turn the limit switch on. However, if the LCD monitor 20 is transferred to the fully buried position, then the upper side stopper 11 of the case 10 will push the limit switch 51 installed in the second side end of the LCD monitor 20 and turn the limit switch on.

Furthermore, when the LCD monitor 20 is fully buried into a specific position or it is developed into a specific position, then the respective limit switches 51, 52, which are pushed by the upper side stopper 11 and are turned on, are connected to the controller 52. When the respective limit switches 51, 52 are pushed by the upper side stopper and turned on, then the controller receives the "ON" signal, and thus the controller 72 recognizes an arrival of the LCD monitor 20 to the buried position and to the developed position.

Meanwhile, the transfer device 40 which transfers the LCD monitor 20 back and forth in the lateral direction according to the control signal of the controller 72 will be explained as follows. First, the forward/reverse motor 41, which is controlled by the control signal from the controller 72, is installed in one side of the lower end of the internal space inside the case 10, whereby the screw axis is integrally connected to the forward/reverse motor 41. Moreover, one end of the screw axis 42 is integrally connected to the rotational axis of the forward/reverse motor 41 and the second end of the screw axis 42 is connected to the second end of the lower end of the internal space inside the case 10, (i.e., to the lower side stopper 12 installed in the opposite side of the forward/reverse motor 41). The thread 42a is formed on the screw axis in the longitudinal direction.

Furthermore, the LCD base 43, which is engaged with the screw axis 42, is installed in the lower end of the LCD monitor 20, whereby the lower surface of the LCD base 43 is configured as the half round-shape surface recess 44 so that the lower surface is connected and seated onto the screw axis 42. In particular, the screw recess 44a is formed on the inner surface of the half round-shape surface recess 44 in a specific interval such that the thread 42a is connected thereto.

Finally, the LCD monitor is seated onto the screw axis 42 through the LCD base 43 and is assembled. The LCD monitor 20 is moved in a longitudinal direction by means of the rotation of the screw axis 42.

When the screw axis 42 rotates, the thread 42a of the screw axis 42 pushes and pulls the LCD base along the screw recess 44a, and thus the LCD base 43 moves in a longitudinal direction of the screw axis.

While the forward/reverse motor 41 rotates, the LCD base 43 moves in the longitudinal direction as the screw axis is rotated. This allows the LCD monitor 20 to move back and forth in a lateral direction, thereby determining the direction of the LCD monitor 20. The LCD monitor 20 can be changed by the rotational direction of the forward/reverse motor 41 and the screw axis 42.

Furthermore, the stopper end 43a protrudes downward and is formed at the outer end of the LCD base 43. The stopper end 43a is configured such that it is contacted with the lower stopper of the case when the LCD monitor 20 is fully buried into the case 10. Preferably, the rubber pad 13 is attached on the contact surface of the lower stopper.

The rubber pad 13 absorbs the impact when the stopper end 43a of the LCD base 43 contacts with the lower side stopper 12 of the case 10 while the LCD monitor 20 is received.

Furthermore, the control box 70 is installed in the inner side end of the LCD monitor 20. The weight block 45 is installed in the second end inside the LCD base 43 below the control box 70. The weight block 45, which is made of steel, balances the mass of gravity of the LCD monitor 20 and is extended out of the case 10.

The weight block 45 prevents the LCD monitor 20 from being leaned on by its self weight. The weight block prevents the upper side rails an excessive force being applied. The weight block is installed in order to balance the mass of gravity, thereby enabling the LCD monitor to be moved in a stable fashion.

Figure 12:
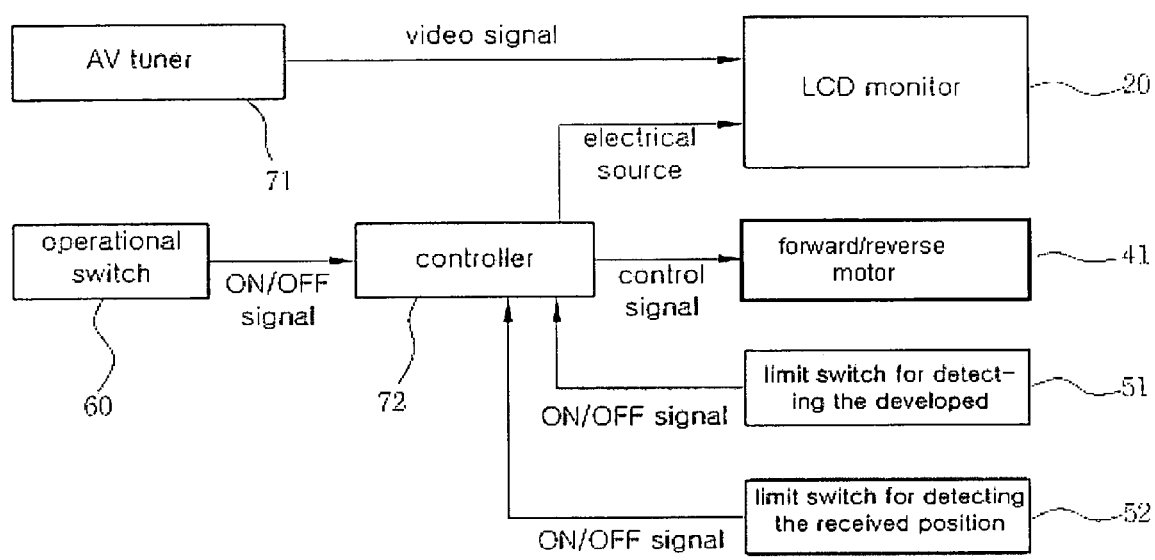
FIG. 12 is a block diagram which illustrates the relationship of the input and output signals between the components according to the present invention.
Figure 13:
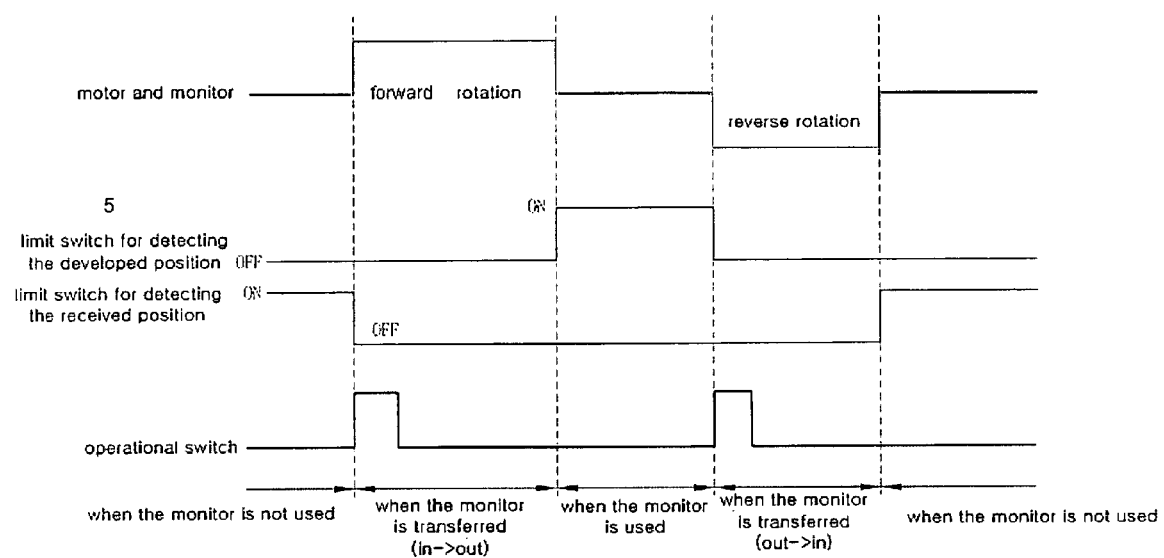
FIG. 13 is an operational timing chart according to the present invention.

In FIG. 12, an AV tuner 71 and the controller 72 which are provided in the control box 70, the operational switch 60 of the outside, the two limit switches 51, 52 of the positioning sensing device, the LCD monitor 20, and the forward/reverse motor 41 of the transfer device for moving the LCD monitor 20 are described therein.

First, when the monitor is not used, the limit switch 51 for detecting the developed position is turned off. The limit switch 52 for detecting the received position is turned on, and no signal is inputted into the LCD monitor 20 through the controller 72. Of course, no power supply is applied into the LCD monitor 20.

After that, the user turns on the operational switch 60, and the signal according to the "On" operation of the operational switch 60 is inputted into the controller 72. The controller 72 supplies the power to the LCD monitor 20.

Furthermore, when the LCD monitor 20 is turned on, the AV tuner 71 is operated according to the signal transferred from the controller 72 and inputs the video signal into the LCD monitor 20, and thus the video image is outputted on the LCD monitor 20.

Furthermore, the forward/reverse motor 41 rotates forward according to the signal outputted from the controller 72. The LCD monitor 20 is transferred out of the shelf 4 and the case 10, and when the LCD monitor 20 arrives a specific position, then the limit switch 51 for detecting the developed position is pushed by the upper side stopper 11 and is turned on.

If the limit switch 51 for detecting the developed position is turned on, then the controller 72 receives the signal according to the operation turning the switch on and detects the arrival of the LCD monitor 20 to the developed position, and stops the drive of the forward/reverse motor 41 in order to stop the movement of the LCD monitor 20 simultaneously.

Here, the image is displayed by the LCD monitor 20 as the video signal is transferred from the AV tuner 71, and the passengers can watch the LCD monitor 20.

Furthermore, the limit switch 51 for detecting the developed position is turned on, while the passengers watch the LCD monitor 20.

Meanwhile, if the user turns off the operational switch 60, then the signal according to the operation turning the switch off is inputted into the controller 72, and the controller 72 shuts out the power into the LCD monitor 20.

Furthermore, the operation of the AV tuner 71 is also stopped by means of the signal transferred from the controller 72. At the same time, the forward/reverse motor 41 is rotated reversibly by means of the signal from the controller 72, and thus the LCD monitor 20 moves in the case 10 and shelf 4.

The limit switch 51 for detecting the developed position is turned off by releasing the contact with the upper side stopper 11 when the LCD monitor 20 starts to move. If the LCD monitor 20 is fully received in the case 10, then the limit switch 52 for detecting the received position is pushed by the upper side stopper 11 of the case 10 and is turned on.

If the limit switch 52 for detecting the received position is turned on, then the controller 72 receives the signal according to the operation turning the switch on and detects the arrival of the LCD monitor 20 to the received position. This stops the drive of the forward/reverse motor 41 in order to stop the movement of the LCD monitor 20 simultaneously. In this state, the limit switch 52 for detecting the received position is turned on.

As described above, when the LCD monitor 20 is fully received in the case 10, then the LCD monitor 20 does not protrude from the shelf 4 and is buried in the shelf 4. The outer contour of the LCD monitor 20 corresponds to the outer contour of the external case 10.

The lateral movement of the LCD monitor 20 is accomplished by the rotation of the screw axis 42 engaged with the LCD base 43 through the drive of the forward/reverse motor 41. The drive of the forward/reverse motor 41 is controlled by the controller 72 and detects the arrival of the developed position and the received position.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A monitor apparatus for a vehicle comprising:
   a case that is installed in a shelf and attached to a lateral surface of a roof in the vehicle;
   a LCD monitor that is assembled so as to slide in a lateral direction through a connection/guide device;
   a positioning sensing device that is installed in the case so as to detect the position of the LCD monitor;
   a controller that outputs a control signal which moves the LCD monitor to a fully developed position or a fully received position according to a signal from an operational switch and a signal from the positioning sensing device; and
   a transfer device that transfers the LCD monitor in response to control signals generated from the controller between the fully received position and the fully developed position in the lateral direction,
   wherein the positioning sensing device comprising:
   a limit switch for detecting the received position and a limit switch for detecting the developed position installed in a first side of the upper end of the LCD monitor and in the second side of the upper end of the LCD monitor respectively; and
   an upper side stopper that protrudes from the internal surface of an inlet of the case so as to press the limit switch for detecting the received position in the fully received position of the LCD monitor and so as to press the limit switch for detecting the developed position in the fully developed position of the LCD monitor.

2. The monitor apparatus for a vehicle according to claim 1, wherein each component is built in an internal space defined by the shelf and neighboring lids.

3. The monitor apparatus for a vehicle according to claim 1, wherein the connection/guide device comprises: a female rail and a male rail which are installed in the inner surface of the upper side of the case and in the upper side of the LCD monitor, respectively and are slidably connected to each other.

4. The monitor apparatus for a vehicle according to claim 1, wherein the transfer device comprising:
   a forward/reverse motor which is installed in one side end of the lower end of the internal space of the case and is capable of rotating forward or backward in response to a control signal generated by the controller, the forward/reverse motor being; and
   a screw axis whose one end is integrally connected to the rotational axis of the forward/reverse motor, and the second end of which is connected to a lower side stopper installed in the second side end of the lower side of the internal space of the case, and the screw axis being operatively coupled to a LCD base installed in the lower end of the LCD monitor, thereby pushing or pulling the LCD monitor in a lateral direction in accordance with the direction of rotation of the forward/reverse motor.

5. The monitor apparatus for a vehicle according to claim 4, wherein the LCD base comprises a half round-shape surface recess, which is formed on the lower surface thereof, and wherein a screw thread is formed on an inner surface of the half round-shape surface recess wherein the screw thread is engaged with a thread formed on the screw axis.

6. The monitor apparatus for a vehicle according to claim 4 or 5, wherein a stopper end is formed in one outer end of the LCD base, and the stopper end contacts with the lower side stopper and is caught by the lower side stopper when the LCD monitor is fully received in the case.

7. The monitor apparatus for a vehicle according to claim 6, wherein a rubber pad for absorbing an impact is attached to the surface of the lower side stopper, which is in contact with the stopper end.

8. The monitor apparatus for a vehicle according to claim 4 or 5, wherein a weight block is installed in the second end of the LCD base in one piece.

* * * * *